(12) United States Patent
Yang et al.

(10) Patent No.: US 11,908,120 B2
(45) Date of Patent: Feb. 20, 2024

(54) FAULT DETECTION METHOD AND SYSTEM FOR TUNNEL DOME LIGHTS BASED ON IMPROVED LOCALIZATION LOSS FUNCTION

(71) Applicant: East China Jiaotong University, Nanchang (CN)

(72) Inventors: Gang Yang, Nanchang (CN); Cailing Tang, Nanchang (CN); Lizhen Dai, Nanchang (CN); Zhipeng Yang, Nanchang (CN); Yuyu Weng, Nanchang (CN); Hui Yang, Nanchang (CN); Rongxiu Lu, Nanchang (CN); Fangping Xu, Nanchang (CN); Shuo Xu, Nanchang (CN)

(73) Assignee: EAST CHINA JIAOTONG UNIVERSITY, Nanchang (CN)

( * ) Notice: Subject to any disclaimer, the term of this patent is extended or adjusted under 35 U.S.C. 154(b) by 48 days.

(21) Appl. No.: 17/895,713

(22) Filed: Aug. 25, 2022

(65) Prior Publication Data
US 2023/0368354 A1 Nov. 16, 2023

(30) Foreign Application Priority Data
May 11, 2022 (CN) .......................... 202210510312.1

(51) Int. Cl.
*G06T 7/00* (2017.01)
*G06T 7/70* (2017.01)
(Continued)

(52) U.S. Cl.
CPC .............. *G06T 7/0002* (2013.01); *G06T 7/70* (2017.01); *G06T 7/97* (2017.01); *G06V 10/774* (2022.01);
(Continued)

(58) Field of Classification Search
CPC ........... G06T 7/0002; G06T 7/70; G06T 7/97; G06T 2207/10016; G06T 2207/20081;
(Continued)

(56) References Cited

FOREIGN PATENT DOCUMENTS

CN 114170161 A 3/2022

OTHER PUBLICATIONS

Zheng, T., et al., "SCALoss: Side and Corner Aligned Loss for Bounding Box Regression," Apr. 26, 2022, 9 pages.

*Primary Examiner* — Ping Y Hsieh
(74) *Attorney, Agent, or Firm* — Lowe Graham Jones PLLC; Ellen M. Bierman

(57) ABSTRACT

A fault detection method and system for tunnel dome lights based on an improved localization loss function. The method includes: constructing a dataset of tunnel dome light detection images; acquiring a you only look once (YOLO) v5s neural network based on the improved localization loss function; training the YOLO v5s neural network according to the dataset to obtain a trained YOLO v5s neural network; acquiring a to-be-detected tunnel dome light image; detecting, with the trained YOLO v5s neural network, the to-be-detected tunnel dome light image to obtain position coordinates of luminous dome lights; and determining, according to the position coordinates of the luminous dome lights, whether a fault occurs in the tunnel dome lights. The present disclosure can accurately localize the tunnel dome lights and label the positions, and can detect whether the tunnel dome lights work normally according to a relative positional relationship between the labeled dome lights.

5 Claims, 9 Drawing Sheets

(51) Int. Cl.
*G06V 20/70* (2022.01)
*G06V 20/40* (2022.01)
*G06V 10/82* (2022.01)
*G06V 10/774* (2022.01)
*G06V 10/776* (2022.01)

(52) U.S. Cl.
CPC ............ *G06V 10/776* (2022.01); *G06V 10/82* (2022.01); *G06V 20/46* (2022.01); *G06V 20/70* (2022.01); *G06T 2207/10016* (2013.01); *G06T 2207/20081* (2013.01); *G06T 2207/20084* (2013.01)

(58) Field of Classification Search
CPC ........ G06T 2207/20084; G06V 10/774; G06V 10/776; G06V 10/82; G06V 20/46; G06V 20/70; G06N 3/045; G06N 3/08; G06F 18/2415
See application file for complete search history.

FAULT DETECTION METHOD AND SYSTEM FOR TUNNEL DOME LIGHTS BASED ON IMPROVED LOCALIZATION LOSS FUNCTION

CROSS REFERENCE TO RELATED APPLICATION(S)

This patent application claims the benefit and priority of Chinese Patent Application No. 202210510312.1, filed on May 11, 2022, the disclosure of which is incorporated by reference herein in its entirety as part of the present application.

TECHNICAL FIELD

The present disclosure relates to the field of fault detection, and in particular to a fault detection method and system for tunnel dome lights based on an improved localization loss function.

BACKGROUND ART

Due to insufficient lanes and large traffic flows in expressway tunnels, any traffic accident of the expressway tunnels will result in serious casualties. In order to reduce traffic accidents in the tunnels, it is essential to monitor safety of the tunnel environment timely and effectively. At present, devices in the expressway tunnels are all inspected manually. Specifically, the tunnels are inspected manually at regular intervals to discover problems of the devices and make records for them, thereby finding constructors for maintenance. The manual inspection for the tunnels has the disadvantages of high labor intensity, time consumption, and poor timeliness and reliability; and in view of the tunnel environment, the manual inspection is conducted infrequently. If the tunnels are not inspected in time for a long time, the problems may be accumulated to indirectly cause serious traffic accidents. Artificial intelligent inspection is envisioned as a desirable method for the tunnel environment, because it can discover the problems of devices in the tunnel environment and handle them timely and effectively. Hence, there is a need to apply intelligent detection algorithms to detect the tunnel dome lights accurately and timely.

Some scholars at home and abroad have started to detect objects in tunnels with intelligent algorithms. However, the detection is intended mainly for cracks in such special tunnels as subway tunnels and utility tunnels. Compared with the expressway tunnels, the special tunnels are detected more easily for a fixed environment and a low rate of foreign object invasion. The conventional feature extraction is susceptible to scenarios and light rays, and far from satisfactory in intelligent analysis. Deep learning can automatically construct the most suitable features for special problems, and thus is more advantageous to the image analysis field than the conventional image processing method.

There have been mainly two object detection methods using the deep learning, including two-stage object detection in which objects are localized first and then recognized, such as Fast-region-based convolutional neural network (Fast-RCNN) algorithms, and end-to-end one-stage object detection developed rapidly in recent years, such as you only look once (YOLO) algorithms. At present, the two-stage object detection is more applied to detect objects in the tunnel environment than the one-stage object detection. However, while meeting the requirements of actual applications, the one-stage object detection has the speed faster than the two-stage object detection and the accuracy almost the same as the two-stage object detection.

SUMMARY

An objective of the present disclosure is to provide a fault detection method and system for tunnel dome lights based on an improved localization loss function, which can accurately localize the tunnel dome lights and label the positions, and can detect whether the tunnel dome lights work normally according to a relative positional relationship between the labeled dome lights. Therefore, it is proposed to employ the one-stage object detection YOLO v5 to detect the tunnel dome lights and improve the one-stage object detection for better use in the tunnel environment.

In order to achieve the above objective, the present disclosure provides the following technical solutions:

A fault detection method for tunnel dome lights based on an improved localization loss function includes:
constructing a dataset of tunnel dome light detection images;
acquiring a YOLO v5s neural network based on the improved localization loss function;
training the YOLO v5s neural network according to the dataset to obtain a trained YOLO v5s neural network;
acquiring a to-be-detected tunnel dome light image;
detecting, with the trained YOLO v5s neural network, the to-be-detected tunnel dome light image to obtain position coordinates of luminous dome lights; and
determining, according to the position coordinates of the luminous dome lights, whether a fault occurs in the tunnel dome lights.

A fault detection system for tunnel dome lights based on an improved localization loss function includes:
a dataset construction module, configured to construct a dataset of tunnel dome light detection images;
a neural network acquisition module, configured to acquire a YOLO v5s neural network based on the improved localization loss function;
a training module, configured to train the YOLO v5s neural network according to the dataset to obtain a trained YOLO v5s neural network;
a to-be-detected image acquisition module, configured to acquire a to-be-detected tunnel dome light image;
a position detection module, configured to detect, with the trained YOLO v5s neural network, the to-be-detected tunnel dome light image to obtain position coordinates of luminous dome lights; and
a fault recognition module, configured to determine, according to the position coordinates of the luminous dome lights, whether a fault occurs in the tunnel dome lights.

According to the specific embodiments provided by the present disclosure, the present disclosure achieves the following technical effects:

With the improved localization loss function, which is a side, corner and aspect ratio loss for bounding box regression (SCALoss) function, for replacing the localization loss function in the original YOLO v5s, the present disclosure makes the detection algorithm more feasible to detect continuous and dense tunnel dome lights in the videos. The improved YOLO v5s model can accurately localize all tunnel dome lights near the camera in the videos and label the positions, and can determine whether the tunnel dome lights work normally according to a relative positional relationship between the labeled dome lights.

BRIEF DESCRIPTION OF THE DRAWINGS

To describe the embodiments of the present disclosure or the technical solutions in the related art more clearly, the accompanying drawings required in the embodiments are briefly introduced below. Obviously, the accompanying drawings described below are only some embodiments of the present disclosure. Those of ordinary skill in the art may further obtain other accompanying drawings based on these accompanying drawings without creative labor.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a fault detection method and system for tunnel dome lights based on an improved localization loss function, which can accurately localize the tunnel dome lights and label the positions, and can detect whether the tunnel dome lights work normally according to a relative positional relationship between the labeled dome lights.

To make the above-mentioned objective, features and advantages of the present disclosure clearer and more comprehensible, the present disclosure will be further described in detail below in conjunction with the accompanying drawings and specific embodiments.

Figure 1:
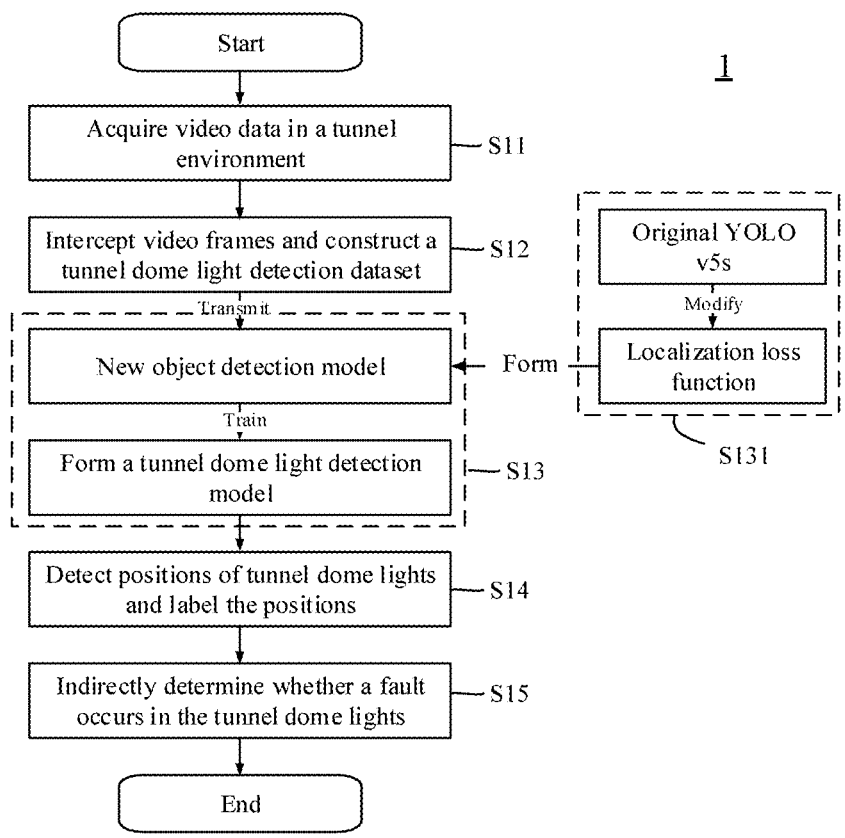
FIG. 1 is a flowchart of a fault detection method for tunnel dome lights based on an improved localization loss function according to the present disclosure.

The present disclosure provides a fault detection method 1 for tunnel dome lights based on an improved localization loss function, which includes steps S11-S15. As shown in FIG. 1, a dataset for detecting dome lights in a tunnel environment is constructed first. In view of no relevant dataset disclosed for the expressway tunnel at present, there is a need to construct the dataset first.

Generally, pedestrians are not allowed to walk in the expressway tunnels due to the dangerous environment. The dataset is acquired in cooperation with the Jiangxi Traffic Management Department. In step S11, a multi-angle camera on a tunnel inspection robot is used for acquiring videos. Then, in step S12, Video frames in acquired videos are extracted at intervals to obtain a tunnel dome light image set. Tunnel dome lights in the image set are labeled with LabelImg software. Labeled tunnel dome light images are processed into a Pascal VOC dataset suitable for a YOLO model. Next, in step S13, the dataset is transmitted to an object detection model with a improved localization loss function, for training to obtain a tunnel dome light detection model. In step S14, the trained model is used to accurately detect positions of luminous tunnel dome lights.

In step S15, it is indirectly determined whether a fault occurs in the tunnel dome lights. Specifically, as the dome lights in the tunnel environment are distributed uniformly, there is a relatively fixed spacing between the dome lights. Relative distance differences between the positions of the luminous tunnel dome lights are calculated, and a curve chart with respect to the distance differences is drawn. Normally, the detected distance differences between the tunnel dome lights fall within a reasonable range (which varies from different angles and distances of different cameras), and the curve tends to be relatively gentle. However, in case of an abrupt change on the curve, namely the detected distance difference between two lights is large, it can be believed that the tunnel dome lights nearby the position are abnormal. The tunnel dome lights can then be manually inspected once. Any damaged tunnel dome light should be repaired timely to ensure the safe driving environment in the tunnel.

The training the object detection model in step S13 further include a step 131 for constructing the object detection model based on the YOLO algorithm model through modifying the localization loss function. Now, the construction process is described detailedly.

Figure 2:
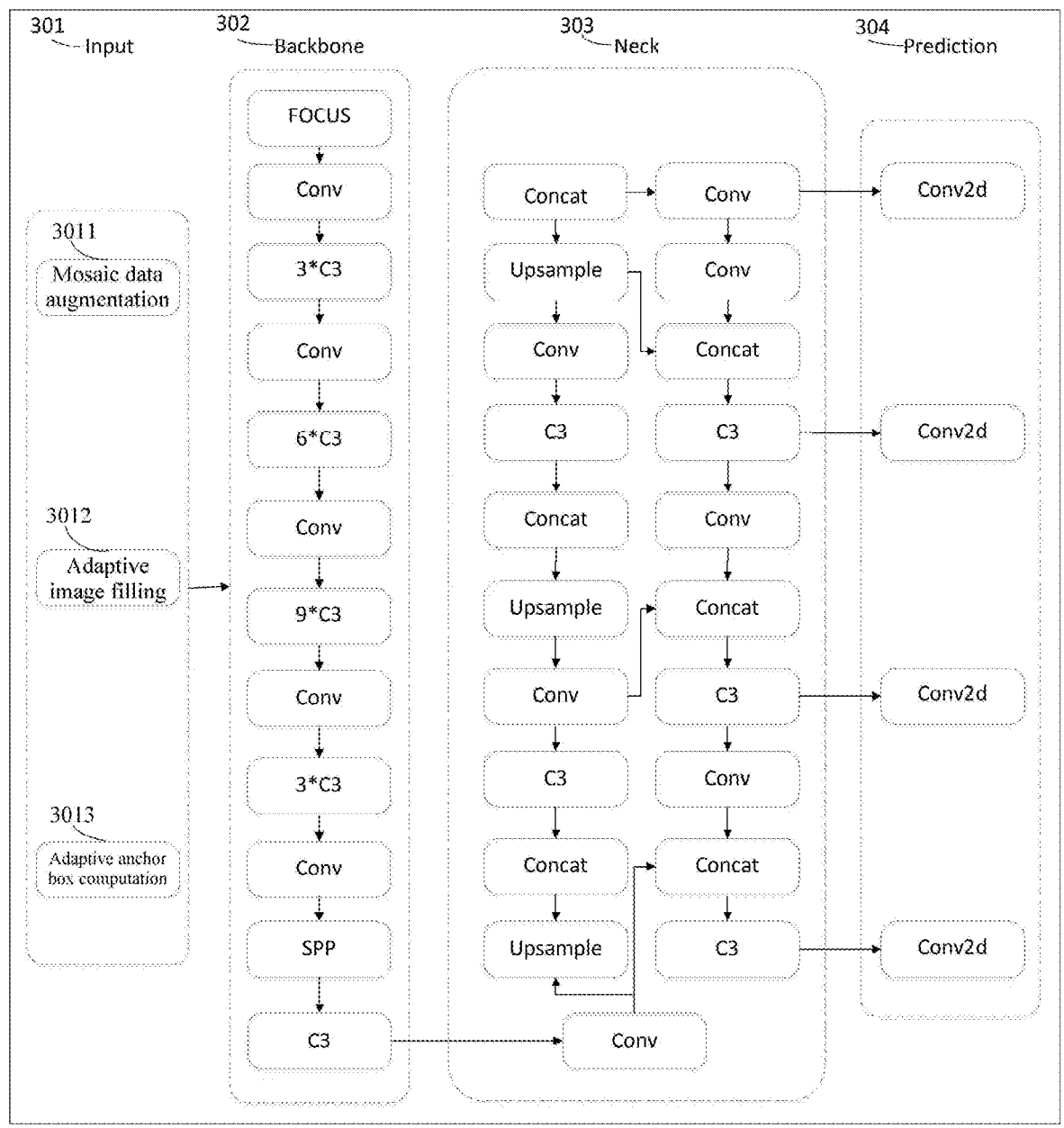
FIG. 2 is a schematic structural view of an original YOLO v5s network model according to the present disclosure.

YOLO v5 Object Detection:

As a typical algorithm of the one-stage object detection, the YOLO algorithm has gained a rapid development since 2016, and evolved to YOLO v5 by 2020. The YOLO v5 algorithmic model is improved from the YOLO v3 algorithm. In terms of the depth and width, there are mainly s, m, l and x models for different scenarios. The detection speed and accuracy of a model depend on its depth and width. Among the four models, the smallest v5s network model is deployed conveniently in an embedded device, with the detection accuracy still suitable for most cases, and the detection speed faster than other models. The structure of the YOLO v5s network 300 is shown in FIG. 2.

The YOLO v5s network model mainly includes four portions, namely Input 301, BackBone 302, Neck 303 and Prediction 304. In Input 301, adaptive image filling 3012, adaptive anchor box computation 3013, and Mosaic data augmentation 3011 are used to process the data, thereby enhancing the correctness and accuracy of the detection. In BackBone, a Darknet53 network structure is provided to extract information from feature networks and images to obtain feature maps for later use. The Neck is designed for feature fusion. Specifically, it fuses the feature maps from BackBone to enhance the expressive ability of the feature maps, and outputs processed feature maps having the same width for later use in Prediction. In Prediction, the model makes predictions with the extracted features upon obtaining the network output. Model training parameters are mainly updated by a loss function. Therefore, the loss function plays a vital role in the YOLO models.

Loss Function:

The YOLO v5 algorithm works by dividing an input image into N*N grids, each of which predicts three indexes: a rectangular box, a confidence and a class probability. The rectangular box represents the size and accurate position of the object. The confidence represents the credibility of the rectangular box, with a value falling within [0,1]. The larger the value, the larger the probability of the object in the rectangular box. The class probability represents the class of the object. During actual detection on classes of objects, whether the confidence of each predicted box is greater than a threshold is determined. It is believed that the predicted box includes an object if the confidence is greater than the threshold, thereby obtaining a general position of the object. Thereafter, predicted boxes including objects are screened by an NMS method, and repeated rectangular boxes corresponding to same objects are removed. The class probability of each screened predicted box is an index corresponding to the maximum probability, and is a classification index of the object. The loss function of the YOLO v5 algorithm mainly includes a classification loss, a localization loss and a confidence loss. A sum of the three losses is constituted as a total loss of the algorithm. The localization is the basis and key for the classification and confidence. The more accurate the localization, the higher the classification accuracy and the confidence. The object localization is of great importance to the object detection model. During model training, the value of the localization loss function is constantly changing with a relative positional relationship between the predicted object box and the ground-truth object box. The value of the localization loss function is smaller when the predicted box is getting closer to the ground-truth box. The whole training process is developed toward the reduced value of the loss function. The value of the localization loss function is constantly changing when feature information of the image is extracted in BackBone, such that the network model adjusts parameters continuously in training and the whole network model can better extract the feature information of the image.

Classification Loss and Confidence Loss:

For the original YOLO v5 algorithm, a CIoU_Loss function is used as the localization loss function to calculate the localization difference between the object box and the ground-truth box, and a multiscale cross-entropy loss function is then used to calculate losses of scores in the class probability and object confidence.

The classification loss and the confidence loss are calculated with the multiscale cross-entropy loss function in the YOLO v5. The multiscale cross-entropy loss function measures the uncertainty of the information with an entropy. For a random variable x having a probability distribution P(x), the entropy is given by Eq. (1):

$$f(x) = \begin{cases} -\int p(x) \log p(x) dx & x \text{ continous} \\ -\sum_x \log p(x) & x \text{ discrete} \end{cases} \quad (1)$$

The higher the uncertainty of the distribution of x, the larger the corresponding entropy, and vice versa. Therefore, when the entropy is used to address the classification problem, the better the classification result, the lower the uncertainty, and the smaller the corresponding entropy. Conversely, the worse the classification result, the higher the uncertainty, and the larger the entropy. Accordingly, the cross-entropy loss in multiclass classification is given by Eq. (2):

$$L(X_i, Y_i) = -\sum_{j=1}^{c} y_{ij} * \log(p_{ij}) \quad (2)$$

$p_{ij}$ represents that the probability of sample i belongs to a class j. In actual applications, the probability that each sample belongs to each class is usually obtained with a softmax function.

Localization Loss:

For the original localization loss function, the accuracy of a localized position is evaluated by detecting an intersection over union (IoU) between the predicted box and the ground-truth box. Assuming that the ground-truth box is B and the predicted box is $\hat{B}$, the corresponding IoU can be given by Eq. (3):

$$IoU = \frac{B \cap \hat{B}}{B \cup \hat{B}} \quad (3)$$

The IoU is a ratio of an intersection to a union between two boxes. IoU_Loss can be given by Eq. (4):

$$L_1 = 1 - IoU \quad (4)$$

This value is used to describe the extent of overlap between two boxes. When the two boxes are non-overlapping, the IoU is 0 and the IoU_Loss function has a value of 1. During bounding box regression of the object detection, any loss function having the value of 1 cannot be iterated. Therefore, the considerations should be given to the change of the loss function when there is no overlap area between the two boxes. The loss function should have a smaller value when two boxes are closer. Correspondingly, only when the distance between the two boxes extends to infinity, the loss is maximum, and the value of the loss function is close to 1. In view of this, a penalty term is added to the loss function, and there emerges GIoU_Loss that is specifically calculated by Eq. (5):

$$L_G = 1 - IOU + R(B, \hat{B}) \quad (5)$$

$R(B, \hat{B})$ is the penalty term. The larger the distance between the ground-truth box and the predicted box, the greater the penalty. The penalty term is calculated by Eq. (6):

$$R(B, \hat{B}) = \frac{|C - B \cup \hat{B}|}{|C|} \quad (6)$$

As can be seen from the above Eq., when there is no overlap area between two boxes, IoU is 0, but R still suffers a loss. However, the above two loss functions only consider the extent of overlap between the two boxes, rather than a center point distance between the two boxes. Normally, it is believed that the loss is smaller only when center points of the two boxes are closer. Therefore, on the basis of DIo- U_Loss, CIoU_Loss takes into account more factors including the overlap area, center point distance and aspect ratio (AR), and is specifically calculated by Eq. (7):

$$L_C = 1 - IoU + R(B, \hat{B}) = \tag{7}$$
$$= 1 - IoU + \frac{\rho^2(B, \hat{B})}{c^2} + \alpha v$$

where:

$$v = \frac{4}{\pi^2}\left(\arctan\frac{w}{h} - \arctan\frac{\hat{w}}{\hat{h}}\right)^2 \tag{8}$$

$$\alpha = \frac{v}{(1 - IoU) + v} \tag{9}$$

From the above, on the basis of DIoU_Loss, CIoU_Loss uses v to measure a difference between aspect ratio of the two boxes. α is a coefficient of balance, with the value determined by IoU and v. The original YOLO v5 model uses CIoU_Loss as the localization loss function of the bounding box.

The above three loss functions, namely GIoU_Loss, DIoU_Loss and CIoU_Loss, improve a baseline for the high overlapping metric, but still have a gradient vanishing problem. Small gradients produced by low overlapping boxes may be drowned into large gradients by high overlapping ones. In a case where objects are small and are densely distributed, the localization may be inaccurate, and the localization loss is rather large.

YOLO v5s algorithm based on the improved localization loss function:

In tunnel monitoring videos, it is difficult to accurately recognize the tunnel dome lights due to small sizes and relatively continuous positions of the tunnel dome lights. The original YOLO v5 function uses the CIoU loss function. However, in case of low-overlapping bounding boxes, the IoU-based loss function has the gradient vanishing problem. To maximize the side overlap (SO) between two bounding boxes, a SCALoss function is proposed. The SCALoss is a combination of a SO loss, a corner distance (CD) loss and an AR loss. With the SO, more penalties will be brought to the case with the low-overlapping bounding boxes. Besides, to speed up the convergence speed, the CD is added to the object function. In order that the predicted box and the ground-truth box have the more similar Aspect ratio to speed up the convergence speed of the network model, the AR Loss of the ground-truth box and the predicted box are added to measure the consistency between the aspect ratio of the two boxes, and thus a more normalized predicted box with a smaller loss is obtained. By adding the three losses, a new regression object function, namely the SCALoss function, can be obtained. The loss function puts more penalties for the low-overlapping bounding boxes, such that the network model achieves better localization performance and faster convergence speed.

The SCALoss function can make the bounding box change the position and shape faster than the original IoU and CIOU_Loss functions, thereby speeding up the convergence speed. The loss function includes the SO loss ($L_{SO}$), the CD loss ($L$) and the AR loss ($L_{AR}$).

The SCALoss function is calculated by Eq. (10):

$$L_{SCA}=L_{SO}+\alpha L_{CD}+L_{AR} \tag{10}$$

The SO loss is used to measure a similarity between the bounding boxes by maximizing the overlap of widths and heights. It provides more gradients for the low-overlapping bounding box. Assuming that the ground-truth box has a coordinate $B=(x_1, x_2, y_1, y_2)$, and the predicted box has a coordinate $\hat{B}=(\hat{x}_1,\hat{x}_2,\hat{y}_1,\hat{y}_2)$, $L_{SO}$ is calculated by Eq. (11):

$$L_{SO}=2-SO \tag{11}$$

SO is calculated by Eq. (12):

$$SO = \frac{w_{min}}{w_{max}} + \frac{h_{min}}{h_{max}} \tag{12}$$

Figure 3:
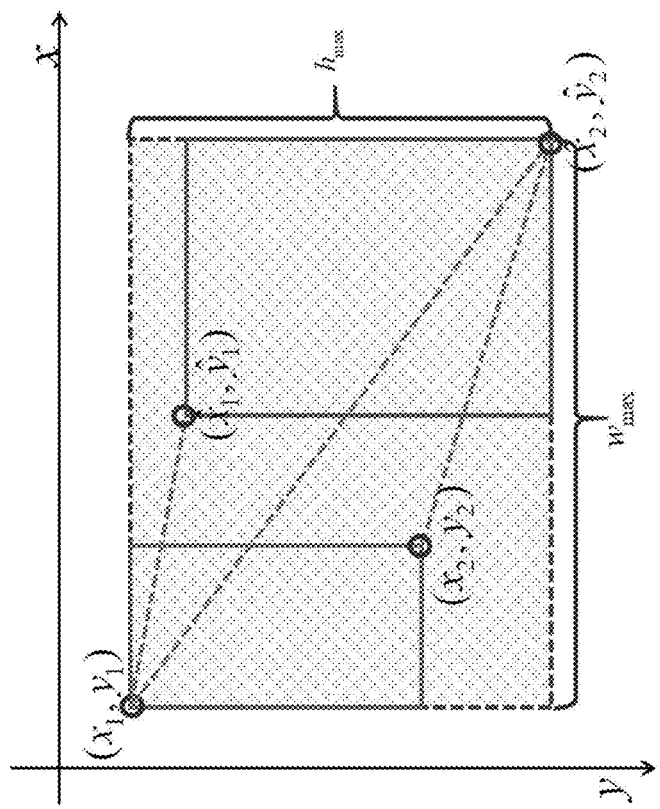
FIG. 3 is a schematic structural view of various values in a SCALoss function according to the present disclosure.
Figure 3:
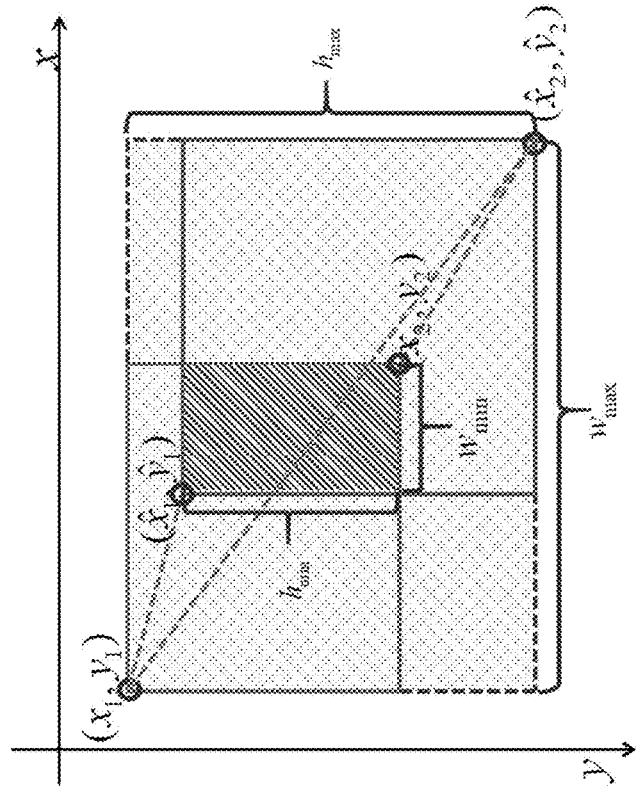

Values of various parameters are as shown in FIG. 3. where:

$w_{max}=\max(x_2,\hat{x}_2)-\min(x_1,\hat{x}_1), w_{min}=\min(x_2,\hat{x}_2)-\max(x_1,\hat{x}_1)$ $h_{min}=\min(y_2,\hat{y}_2)-\max(y_1,\hat{y}_1), h_{max}=\max(y_2,\hat{y}_2)-\min(y_1,\hat{y}_1)$ $w_{min}$ and $h_{min}$ may be negative when the bounding boxes are non-overlapping.

In the figure, the intersected portion between two rectangular boxes refers to an intersection, namely Inter, and the portion enclosed by the dotted box refers to a union that is a smallest box enclosing the ground-truth box and the predicted box at the same time, namely Union. $(x_1, y_1)$ and $(x_2, y_2)$ are coordinates of top left and bottom right vertexes on the ground-truth box. $(\hat{x}_1, \hat{y}_1)$ and $(\hat{x}_2, \hat{y}_2)$ are coordinates of top left and bottom right vertexes on the predicted box. w, h, $\hat{w}$ and $\hat{h}$ are widths and heights of the ground-truth box and the predicted box.

The CD loss ($L_{CD}$) is intended to minimize the normalized corner distance by measuring the distance difference between the ground-truth box and the predicted box, and is calculated by Eq. (13):

$$L_{CD} = \frac{D_{lt}}{D_{diag}} + \frac{D_{rb}}{D_{diag}} \tag{13}$$

D is an Euclidean distance, $D_{lt}$ and $D_{rb}$ are Euclidean distances between top right and bottom left coordinates recorded by the predicted box and the ground-truth box, and $D_{diag}$ is an Euclidean distance between top right and bottom left coordinates on a smallest enclosing box covering the two boxes, namely the portion represented by the dotted box in FIG. 3. There are the following Eqs. (14)-(16).

$$D_{lt}=(x_1-\hat{x}_1)^2 \tag{14}$$

$$D_{rb}=(x_2-\hat{x}_2)^2+(y_2-\hat{y}_2)^2 \tag{15}$$

$$D_{diag}=(x_2{}^c-x_1{}^c)^2+(y_2{}^c-y_1{}^c)^2 \tag{16}$$

α is a weight coefficient, and is set as 0.25.

The AR loss ($L_{AR}$) is intended to determine a difference between the Aspect ratio of the ground-truth box and the predicted box, so as to better set the predicted box. $L_{AR}=\beta\upsilon$, where $\upsilon$ and $\beta$ are calculated by Eqs. (17) and (18):

$$\upsilon = \frac{4}{\pi}\left(\arctan\frac{\hat{w}}{\hat{h}} - \arctan\frac{w}{h}\right) \tag{17}$$

$$\beta = \frac{\upsilon}{1 - IOU(B, \hat{B}) + \upsilon} \tag{18}$$

υ is a normalized value for the difference between the Aspect ratio of the ground-truth box and the predicted box, and β is a coefficient of balance and is used to measure the AR loss and the IoU loss.

By changing the original localization loss function into the SCALoss function, the present disclosure can effectively solve the following problems:

In the videos, the present disclosure solves the problems of hard accurate object localization due to a fact that the tunnel dome lights are distributed continuously and densely with unclear boundaries, and the large localization loss due to a fact that a plurality of objects are easily recognized as a small one. The present disclosure can recognize the tunnel dome lights quickly and accurately in the videos, and thus better detect the states of the tunnel dome lights. Moreover, the detection model can also be converged more quickly to reduce the model training time.

EMBODIMENT

By improving loss function, the present disclosure loads the localization loss function to the backbone network of YOLO v5s, and verifies the actual effect. There are the following experimental environment and environmental effect:

1. Experimental Data

In order to verify feasibility and accuracy of the detection algorithm, real tunnel images were acquired from the Jiaojialing Tunnel of Jiangxi Jingying Section in cooperation with the relevant department. There were a normal case and an abnormal case in the acquired images, for sake of establishing a robuster database. The acquired data were labeled, processed into a Pascal VOC format and imported to the improved model for training.

The existing tunnel inspection robot for the Jiaojialing Tunnel of Jiangxi Jingying Section was employed to acquire video images. Positions of tunnel dome lights in the acquired images were labeled with LabelImg software, and at last 5,504 labeled images were obtained. The dataset was randomly divided into a training set and a test set based on a proportion of 0.9:0.1, and there were 4,954 images in the training set and 550 images in the test set. The tunnel environment was as shown in FIG. 4.

Figure 4:
FIG. 4 is a schematic view of a tunnel environment according to the present disclosure.

As can be seen from FIG. 4, the tunnel dome lights are densely distributed, and particularly those away from the camera are nearly connected into a whole. It is difficult for the object detection algorithm to accurately localize positions of the tunnel dome lights, and it is also easy to recognize a plurality of objects as one object. In view of this, the localization loss function is more favorable to localize the small objects.

2. Experimental Environment

The whole model was trained with a Tesla V100 SXM2 32G GPU in the ubuntu20.04.03 environment. A Pytorch 1.10.1 learning framework was constructed to train 300 epochs. Hyper-parameters shown in Table 1 were used for training the model.

TABLE 1

Hyper-parameters for model training

| Training parameter | Value |
|---|---|
| Momentum | 0.937 |
| epochs | 300 |
| Warm_up step | 3 |
| Warm_up momentum | 0.8 |
| Weight decay | 0.0005 |
| Learning rate | 0.01 |

3. Localization Process and Effect

During object detection, sizes and positions of the objects are uncertain, which is one of the difficulties to localize the objects. According to the original sliding window mechanism, the input image is divided into N*N grids, and the stride and window size in each detection are fixed. However, the window sizes are varied for different objects, which causes a huge calculated amount of the sliding window mechanism. Instead of the sliding window mechanism, the YOLO algorithm is implemented by directly segmenting the original image into non-overlapping priori boxes, and convolutionally generating different feature maps. Positions and sizes of the priori boxes are set by clustering.

Thereafter, the labeled positions are changed, and the positions of the labeled boxes are constantly adjusted according to a certain strategy. The strategy is updated mainly depending on values obtained from the localization loss function. For a plurality of predicted boxes obtained at last, only the most suitable predicted box is retained, which is implemented as follows:

All predicted boxes are sorted according to a class probability of a classifier. It is assumed that the predicted boxes are A, B and C in an ascending order.

From the predicted box A with the largest probability, whether the degree of overlap IoU between C and A is greater than a preset threshold is determined.

Obviously, the degree of overlap between B and A is larger. If the degree of overlap is greater than the threshold, B is abandoned and the first rectangular box A is labeled as the retained predicted box.

Figure 5:
FIG. 5 is a schematic view of a non-maximum suppression (NMS) method in localization of tunnel dome lights according to the present disclosure.

Meanwhile, the position where the localized box is localized is adjusted according to a localized box adjustment strategy as shown in FIG. 5.

The above process is repeated until all retained predicted boxes are searched. At last, the predicted box A is retained, and adjusted with the method as shown in FIG. 5.

The improved localization loss function can update the position and size of the localized box, such that the localized box is closer to the ground-truth box.

4. Experimental Results and Analysis

Figure 6:
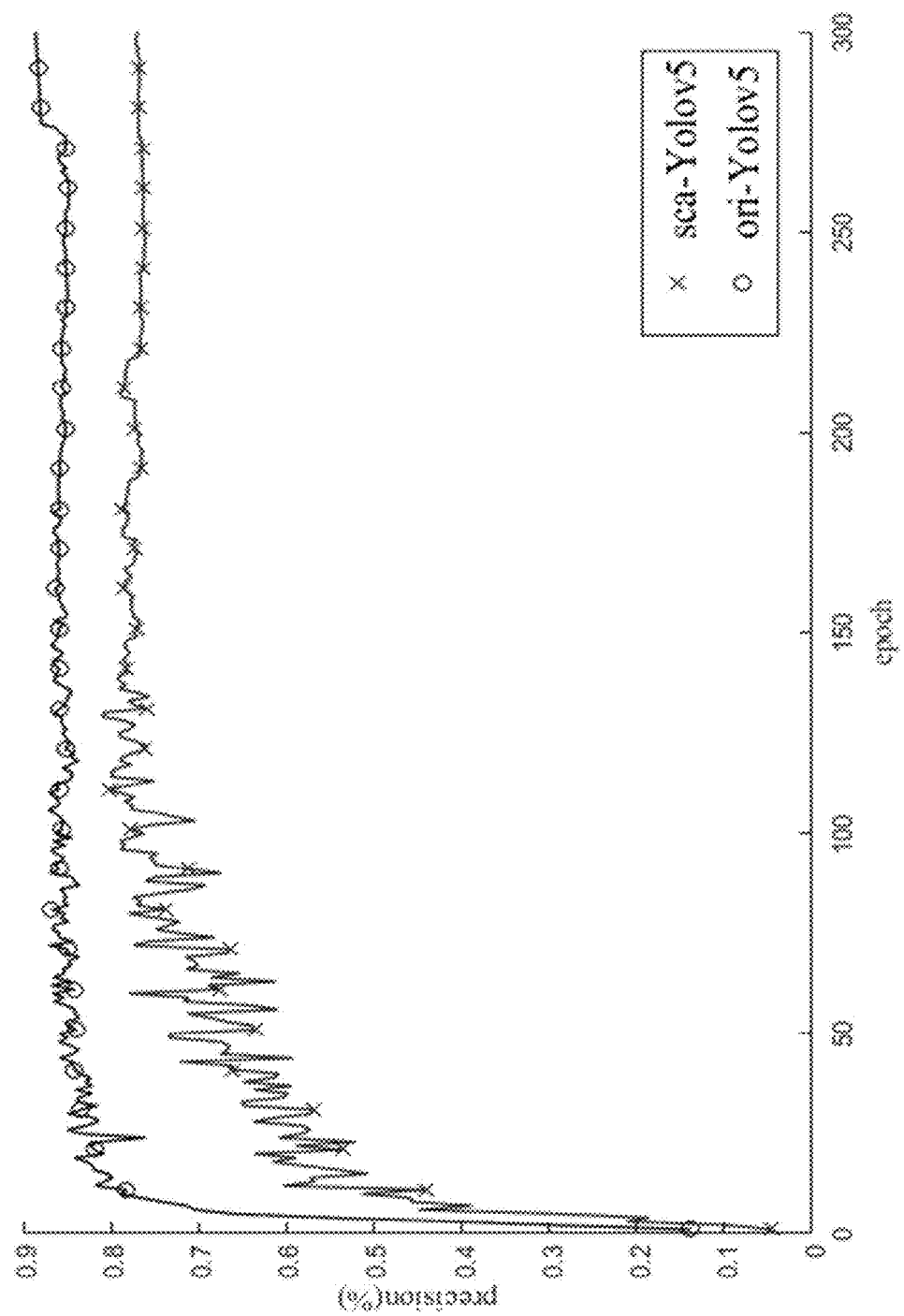
FIG. 6 is a schematic view for a comparison between two models in training accuracy according to the present disclosure.

Before and after the improvement, a comparison between curves for the recognition accuracy of the model on the tunnel dome lights in training is as shown in FIG. 6.

As can be seen from FIG. 6, during 300 epochs on the original YOLO v5s network structure, the network converges and tends to be gentle after about 150 epochs, with the average recognition accuracy on all labeled classes being 0.767. After the localization loss function of the original YOLO v5s model is changed from CIoU_Loss into SCA_Loss, the network model converges gradually after about 50 epochs under the same training environment and dataset. After 300 iterations, the recognition accuracy of the model is converged to 0.898. The improved model has the faster convergence speed and higher recognition accuracy.

Figure 7:
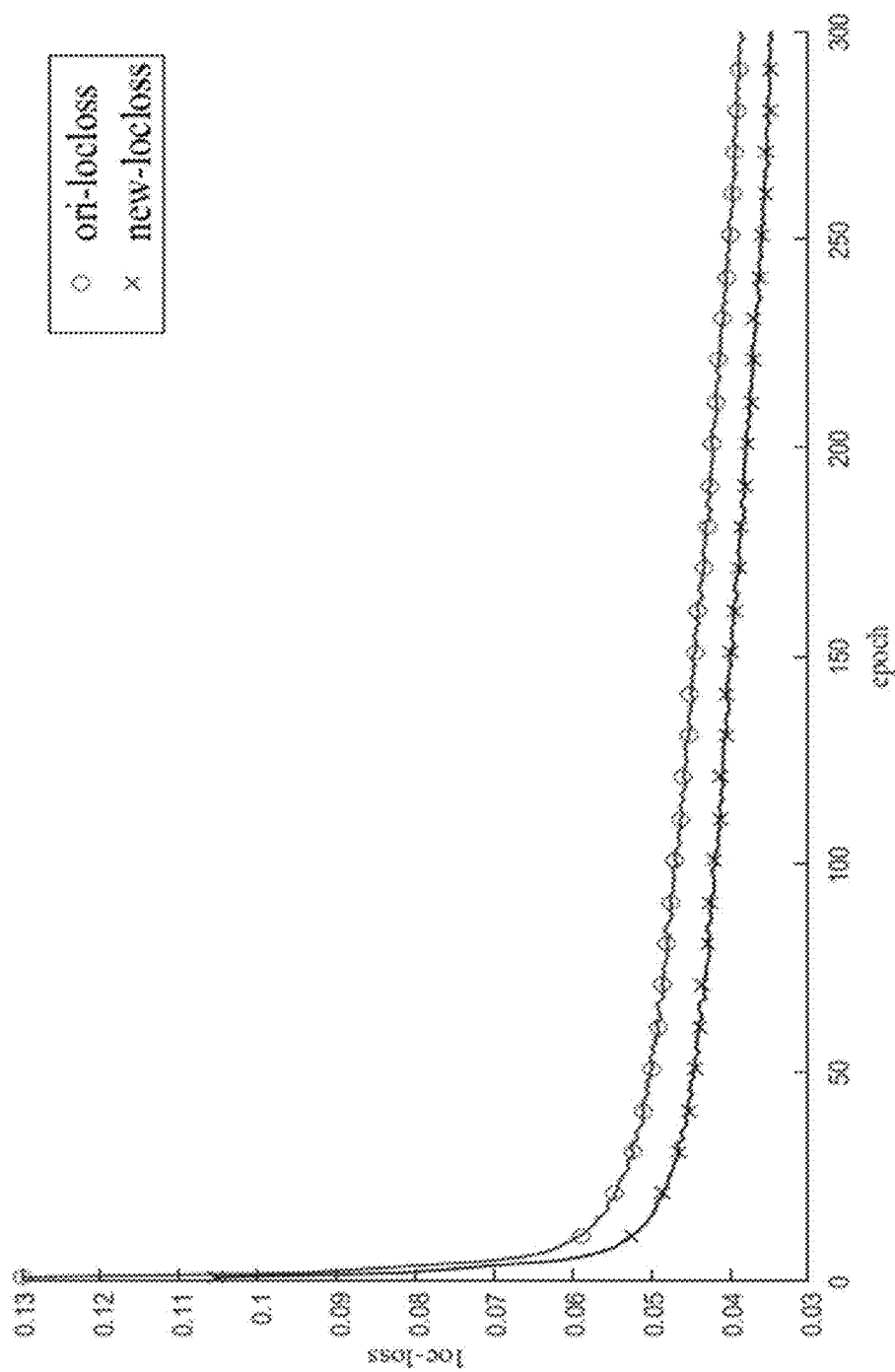
FIG. 7 is a schematic view for a comparison between two models in a localization loss according to the present disclosure.

The comparison between curves for the localization loss during training is as shown in FIG. 7. With 300 epochs, the original localization loss shows the same change as the improved localization loss. However, the new loss function has the faster convergence speed and smaller total localization loss than the original loss function.

The trained models are detected, with the effects as shown in FIG. 8.

Figure 8A:
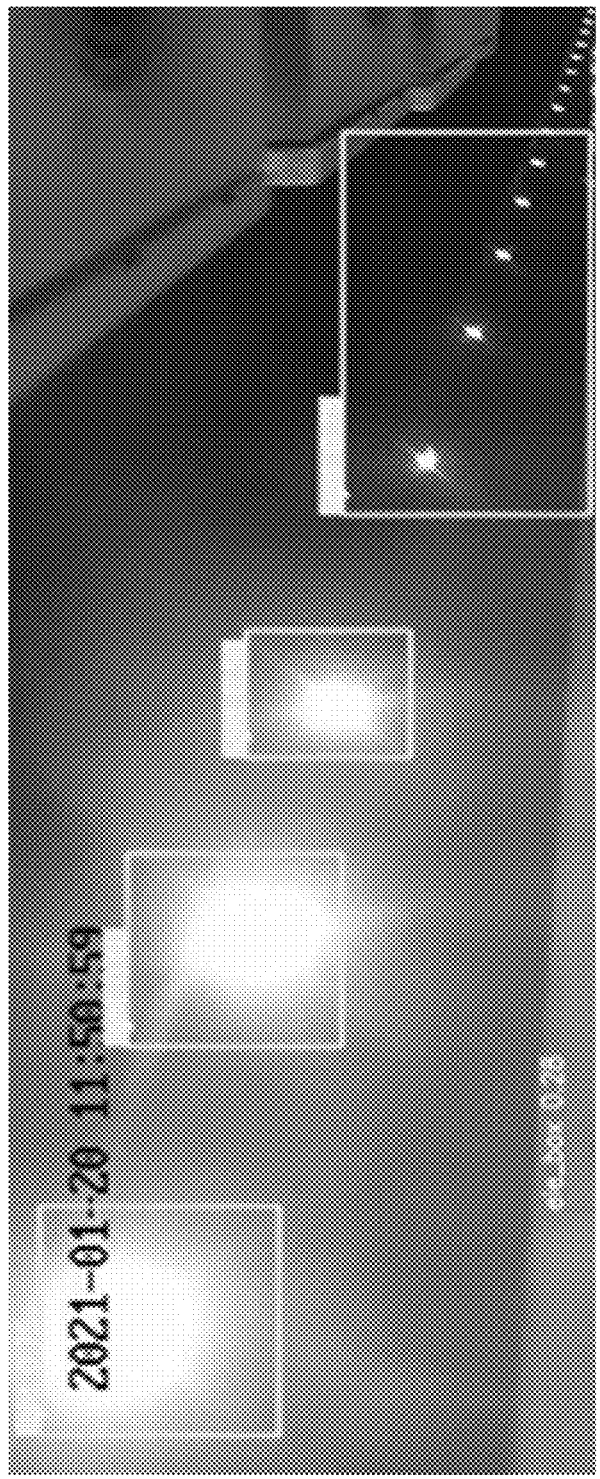
FIG. 8A is a schematic view for a detection effect of an original detection model according to the present disclosure.
Figure 8B:
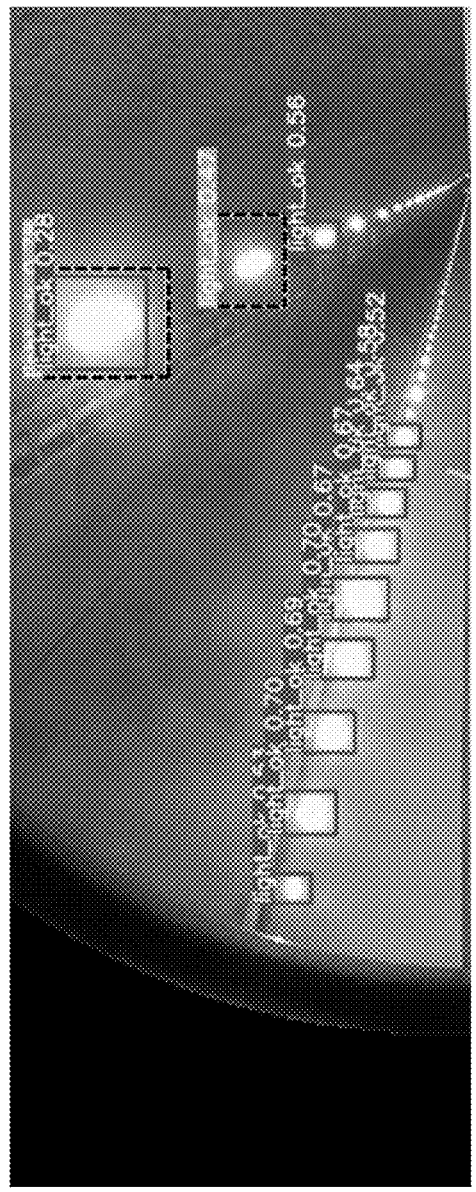
FIG. 8B is a schematic view for a detection effect of an improved detection model according to the present disclosure.

As can be seen from the comparison, when detecting the tunnel dome lights, the original model can detect the positions of the lights, but cannot label them accurately. As shown in FIG. 8A, the original model cannot recognize and label the remote lights at a small angle of view (AOV). With the improved loss function, the model can accurately label all tunnel dome lights nearby, with labeling boxes same as the lights in size. The dotted boxes and solid boxes shown in FIG. 8B refer to the sizes of the labeling boxes before and after the localization loss function is improved. The solid boxes are the improved labeling boxes, while the dotted boxes are the original labeling boxes. The improved loss function has smaller labeling boxes than the original loss function.

Meanwhile, the model has a frame rate of 56.66 fps, which can meet the requirement on real-time recognition.

By changing the localization loss function, the model can accurately recognize the tunnel dome lights and label the positions, and can further determine whether a damaged tunnel dome light exists.

As the tunnel dome lights are uniformly distributed in the tunnel, there is a similar spacing between two lights without a serious deviation when the camera is used to photograph the tunnel dome lights. The recognition algorithm can record coordinates of the tunnel dome lights, calculate a distance difference between two consecutive labeled objects at a same coordinate point, and draw a curve with respect the distance differences. The curve is relatively gentle all the time in case of no fault. However, when there is a fault, namely some light does not work, positions of two consecutive luminous lights detected by the model will change, and the curve will rise abnormally. With the above method, whether the dome lights are abnormal in the tunnel can be determined. (The present disclosure can notify the control terminal of the fault, such that whether the fault occurs can be determined manually again, which can greatly reduce the manpower resources).

Figure 9:
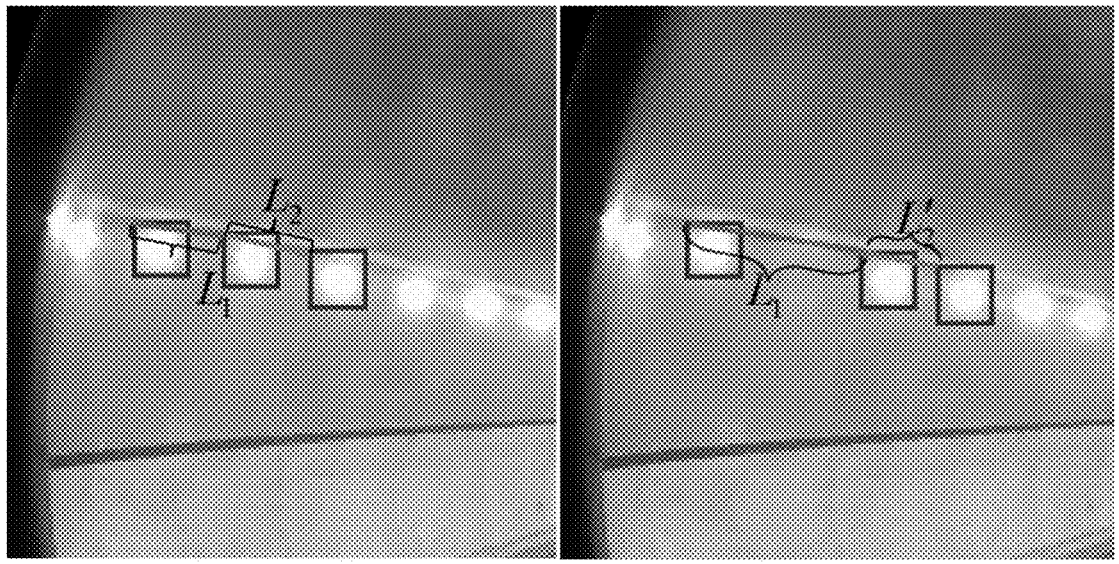
FIG. 9 is a schematic view for determining a fault in tunnel dome lights according to the present disclosure.

As shown in FIG. 9, normally, the distance difference between the labeled tunnel dome lights at the same coordinate point is similar and falls within a certain threshold range. As shown in the left part of FIG. 9, $L_1 \approx L_2$. However, in case of the fault, namely some tunnel dome light does not work, the position of that tunnel dome light cannot be labeled, the distance difference between the consecutively labeled dome lights at the same coordinate point is large, namely $L_1' \square L_2'$, and the drawn curve changes abruptly. Consequently, it is determined that the fault occurs in the tunnel dome light at that position.

Figure 10:
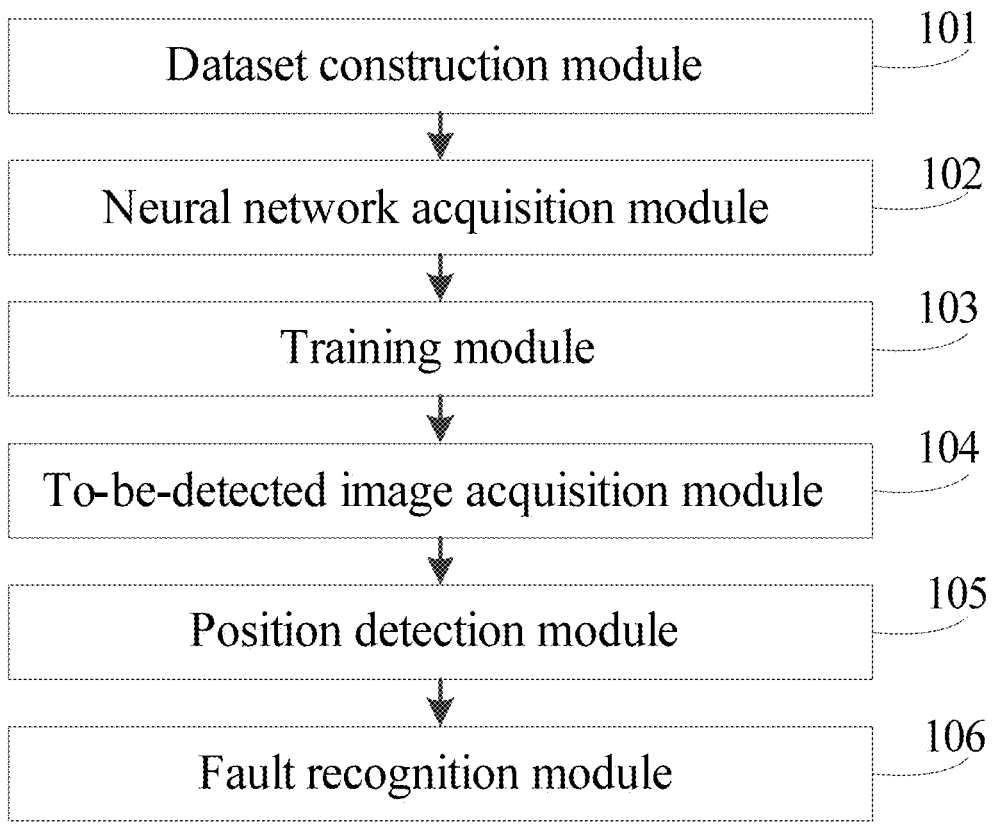
FIG. 10 is a modular diagram of a fault detection system for tunnel dome lights based on an improved localization loss function according to the present disclosure.

Based on the above-mentioned method, as shown in FIG. 10, the present disclosure further provides a fault detection system for tunnel dome lights based on an improved localization loss function, including:

a dataset construction module 101, configured to construct a dataset of tunnel dome light detection images;

a neural network acquisition module 102, configured to acquire a YOLO v5s neural network based on the improved localization loss function;

a training module 103, configured to train the YOLO v5s neural network according to the dataset to obtain a trained YOLO v5s neural network;

a to-be-detected image acquisition module 104, configured to acquire a to-be-detected tunnel dome light image;

a position detection module 105, configured to detect, with the trained YOLO v5s neural network, the to-be-detected tunnel dome light image to obtain position coordinates of luminous dome lights; and a fault recognition module 106, configured to determine, according to the position coordinates of the luminous dome lights, whether a fault occurs in the tunnel dome lights.

In conclusion, the present disclosure achieves the following technical effects.

(1) The present disclosure indirectly detects the tunnel dome lights with the one-stage object detection.

(2) With the SCALoss function for replacing the localization loss function in the original YOLO v5s, the present disclosure makes the detection algorithm more feasible to detect continuous and dense tunnel dome lights in the videos. The model can accurately localize all tunnel dome lights near the camera in the videos and label the positions, and can determine whether the tunnel dome lights work normally according to a relative positional relationship between the labeled dome lights.

(3) The present disclosure acquires the dataset from the Jiaojialing Tunnel of Jiangxi Jingying Section, and inspects the tunnel environment in real time with a movable robot. As a result, the AOV for acquiring the images is more suitable for video detection in the actual environment.

(4) The improved loss function is more desirable to detect the dense and small objects, and can be widely applied in the industrial field.

What is claimed is:

1. A fault detection method for tunnel dome lights based on an improved localization loss function, comprising:

constructing a dataset of tunnel dome light detection images;

acquiring a you only look once (YOLO) v5s neural network based on the improved localization loss function;

training the YOLO v5s neural network according to the dataset to obtain a trained YOLO v5s neural network;

acquiring a to-be-detected tunnel dome light image;

detecting, with the trained YOLO v5s neural network, the to-be-detected tunnel dome light image to obtain position coordinates of luminous dome lights; and determining, according to the position coordinates of the luminous dome lights, whether a fault occurs in the tunnel dome lights;

wherein the constructing a dataset of tunnel dome light detection images specifically comprises:

acquiring videos of the tunnel dome lights with a multi-angle camera;

extracting video frames from acquired videos at intervals to obtain a tunnel dome light image set, labeling tunnel dome lights in the tunnel dome light image set with Labeling software; and processing labeled tunnel dome light images into a Pascal VOC format to obtain the dataset of the tunnel dome light detecting images;

the improved localization loss function is specifically a side, corner and aspect ratio loss for bounding box regression (SCALoss) function, and comprises a side overlap (SO) loss, a corner distance (CD) loss and an aspect ratio (AR) loss; and, the SCALoss function has a following Eq:

$$L_{SCA}=L_{SO}+\alpha L_{CD}+L_{AR}$$

wherein, $L_{SCA}$ is the SCALoss function, $L_{SO}$ is the SO loss, $L_{CD}$ is the CD loss, $L_{AR}$ is the AR loss, and $\alpha$ is a weight coefficient.

2. The fault detection method for tunnel dome lights based on an improved localization loss function according to claim 1, wherein $\alpha$ is 0.25.

3. The fault detection method for tunnel dome lights based on an improved localization loss function according to claim 1, wherein the determining, according to the position coordinates of the luminous dome lights, whether a fault occurs in the tunnel dome lights specifically comprises:

acquiring position coordinates of two consecutive luminous dome lights;

calculating a distance difference between the two consecutive luminous dome lights according to the position coordinates;

determining whether the distance difference is greater than a preset threshold; and determining that the fault occurs in the tunnel dome lights if yes.

4. A fault detection system for tunnel dome lights based on an improved localization loss function, comprising:

a dataset construction module, configured to construct a dataset of tunnel dome light detection images;

a neural network acquisition module, configured to acquire a you only look once (YOLO) v5s neural network based on the improved localization loss function;

a training module, configured to train the YOLO v5s neural network according to the dataset to obtain a trained YOLO v5s neural network;

a to-be-detected image acquisition module, configured to acquire a to-be-detected tunnel dome light image;

a position detection module, configured to detect, with the trained YOLO v5s neural network, the to-be-detected tunnel dome light image to obtain position coordinates of luminous dome lights; and a fault recognition module, configured to determine, according to the position coordinates of the luminous dome lights, whether a fault occurs in the tunnel dome lights;

wherein the dataset construction module specifically comprises:

a video acquisition unit, configured to acquire videos of the tunnel dome lights with a multi-angle camera;

a frame extraction unit, configured to extract video frames from acquired videos at intervals to obtain a tunnel dome light image set;

an image labeling unit, configured to label tunnel dome lights in the tunnel dome light image set with Labelling software; and a format conversion unit, configured to process labeled tunnel dome light images into a Pascal VOC format to obtain the dataset of the tunnel dome light detection images;

the improved localization loss function is specifically a side, corner and aspect ratio loss for bounding box regression (SCALoss) function, and comprises a side overlap (SO) loss, a corner distance (CD) loss and an aspect ratio (AR) loss; and the SCALoss function has a following Eq.:

$$L_{SCA}=L_{SO}+\alpha L_{CD}+L_{AR}$$

wherein, the $L_{SCA}$ is the SCALoss function, $L_{SO}$ is the SO loss, $L_{CD}$ is the CD loss, $L_{AR}$ is the AR loss, and $\alpha$ is a weight coefficient.

5. The fault detection system for tunnel dome lights based on an improved localization loss function according to claim 4, wherein the fault recognition module specifically comprises:

a coordinate acquisition unit, configured to acquire position coordinates of two consecutive luminous dome lights;

a calculation unit, configured to calculate a distance difference between the two consecutive luminous dome lights according to the position coordinates; and a determination unit, configured to determine whether the distance difference is greater than a preset threshold, and determine that the fault occurs in the tunnel dome lights if yes.

* * * * *